US008667153B2

(12) United States Patent
Kamay et al.

(10) Patent No.: US 8,667,153 B2
(45) Date of Patent: Mar. 4, 2014

(54) USING A VIRTUAL NETWORK INTERFACE TO OBTAIN ACCESS TO RESOURCES

(75) Inventors: Yaniv Kamay, Modi'in (IL); Yonit Tova Halperin, Herzelia (IL)

(73) Assignee: Red Hat Israel, Ltd., Raanana (IL)

( * ) Notice: Subject to any disclaimer, the term of this patent is extended or adjusted under 35 U.S.C. 154(b) by 405 days.

(21) Appl. No.: 12/831,917

(22) Filed: Jul. 7, 2010

(65) Prior Publication Data
US 2012/0011263 A1  Jan. 12, 2012

(51) Int. Cl.
*G06F 15/16* (2006.01)

(52) U.S. Cl.
USPC ............ 709/229; 709/206; 709/220; 719/321

(58) Field of Classification Search
USPC .......................... 709/229, 206, 220; 719/321
See application file for complete search history.

(56) References Cited

U.S. PATENT DOCUMENTS

| | | | | |
|---|---|---|---|---|
| 6,442,751 | B1 * | 8/2002 | Cocchi et al. | 717/133 |
| 7,203,190 | B1 * | 4/2007 | Ruban et al. | 370/356 |
| 7,477,594 | B2 * | 1/2009 | Saleh et al. | 370/225 |
| 7,613,798 | B2 | 11/2009 | Mickeleit | |
| 7,991,859 | B1 * | 8/2011 | Miller et al. | 709/220 |
| 2001/0056545 | A1 * | 12/2001 | Takechi et al. | 713/200 |
| 2002/0016868 | A1 * | 2/2002 | Peacock | 709/321 |
| 2005/0141512 | A1 * | 6/2005 | Jeffrey et al. | 370/395.2 |
| 2006/0200821 | A1 * | 9/2006 | Cherkasova et al. | 718/1 |
| 2007/0260693 | A1 * | 11/2007 | Cardone et al. | 709/206 |
| 2008/0016339 | A1 * | 1/2008 | Shukla | 713/164 |
| 2009/0089764 | A1 * | 4/2009 | Lai et al. | 717/143 |
| 2009/0327373 | A1 * | 12/2009 | Chacko et al. | 707/206 |
| 2010/0027448 | A1 * | 2/2010 | Puthiyandyil et al. | 370/310 |

OTHER PUBLICATIONS

"How to improve printing for virtual desktops? .print in a nutshell", Aug. 10, 2009, pp. 1-4, V17, ThinPrint AG, Germany.
ThinPrint White Paper: .print AutoConnect and .print Virtual Channel Gateway, Practice examples (.print version 7.6), Sep. 29, 2009, pp. 1-36, v42, ThinPrint AG, Germany.
ThinPrint White Paper: .print Engine feature comparison, Oct. 21, 2009, pp. 1-5, v49, ThinPrint AG, Germany.
ThinPrint White Paper: ThinPrint .print addressing, Oct. 13, 2009, pp. 1-13, v33, ThinPrint AG, Germany.
"ThinPrint White Paper: ThinPrint ports, Optimally configuring ThinPrint .print", Oct. 13, 2009, pp. 1-13, v20, ThinPrint AG, Germany.
"ThinPrint Technology Features", 2009, (accessed Nov. 10, 2009) ThinPrint AG, http://www.thinprint.com/Technology.aspx.
ThinPrint White Paper: Windows computer as a .print Client Gateway, Practice examples (.print version 7.6), Oct. 13, 2009, pp. 1-16, v48, ThinPrint AG, Germany.

* cited by examiner

*Primary Examiner* — Tesfay Yohannes
(74) *Attorney, Agent, or Firm* — Lowenstein Sandler LLP

(57) ABSTRACT

A first computing device maps a virtual network address for a virtual resource that is accessible to the first computing device to an address of a designated resource that is inaccessible to the first computing device but accessible to a remote second computing device. The first computing device generates a control message that, when acted upon by the second computing device, causes the second computing device to transmit the resource message to the designated resource. The first computing device then attaches the resource message to the control message. The first computing device sends the control message to the second computing device, wherein the second computing device acts on the control message to send the resource message to the designated resource without having a resource driver for the designated resource installed on the second computing device.

19 Claims, 5 Drawing Sheets

USING A VIRTUAL NETWORK INTERFACE TO OBTAIN ACCESS TO RESOURCES

TECHNICAL FIELD

The embodiments of the invention relate to a method and system for accessing remote resources by a computing device that is on a different network than the remote resources.

BACKGROUND

A remote desktop service enables a client to access applications and data on a remote computer, or a virtual machine (VM) that runs on a remote server, over a network. Using a remote desktop service, a remote desktop of a remote machine can be interacted with on a local client computer. Such interaction may include causing the remote application to print a document to a network printer that resides on the client side. However, when the remote machine network architecture and the client are on different networks or subnetworks, the remote machine typically does not have access to the network printers of the client. In a remote desktop service product, to enable the remote machine to print to the printers of the client, a special print application and/or driver are installed at the remote machine for printer redirection. Additionally, the printer driver of the specific printer should be installed at the client. Existing remote desktop service products cannot print to the printer without a printer driver being installed on the client. Additionally, existing remote desktop service products are designed specifically for printing, and cannot be used for other client-side resources.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
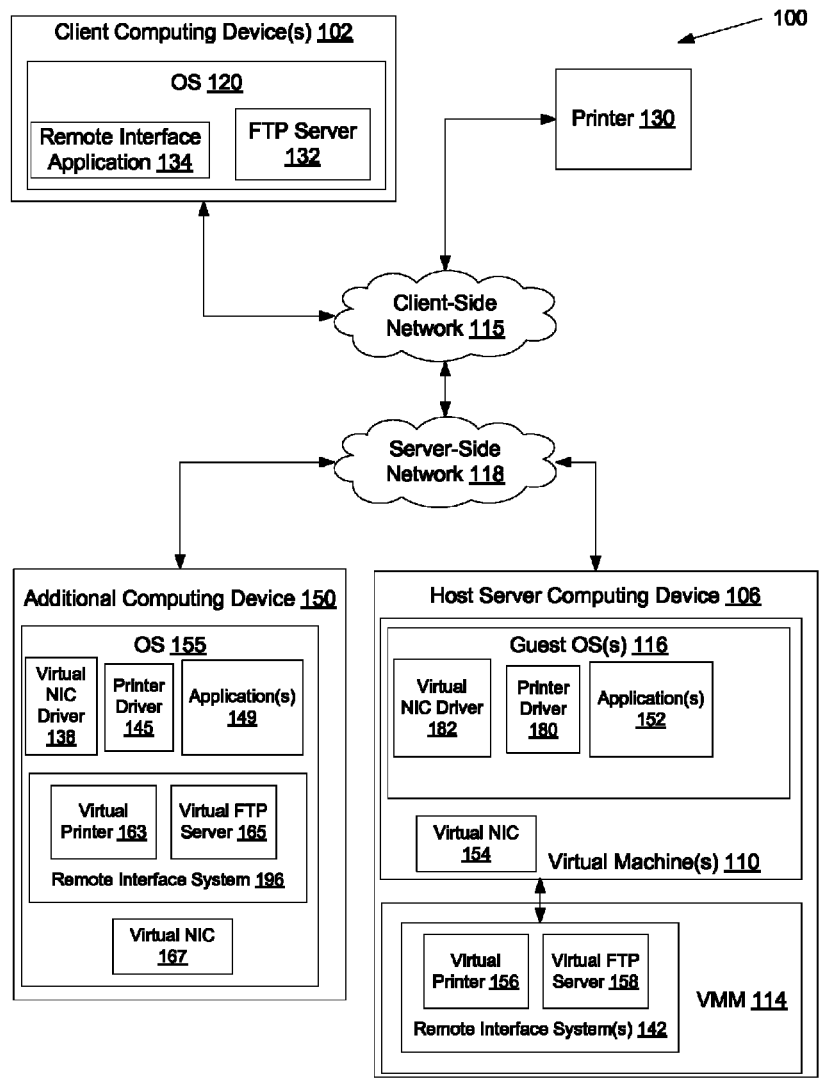
FIG. 1 is a block diagram of a network architecture, in which embodiments of the invention may operate.

A method and system for providing access to resources residing on a first network for a computing device residing on a second network is described. In one embodiment, a first computing device maps a virtual network address for a virtual resource that is accessible to the first computing device to an address of a designated resource that is inaccessible to the first computing device but accessible to a second computing device. The designated resource may be a physical resource such as a network printer or scanner. The first computing device may reside at a first subnetwork, and the designated resource may reside at a second subnetwork that is remote from the first subnetwork. The first computing device may generate resource messages and control messages. The resource messages include data that is acted upon by the resource. The control messages are for monitoring and controlling a connection to the designated resource. Some control messages may include data that, when acted upon by the second computing device, causes the second computing device to transmit the resource message to the designated resource. The first computing device attaches resource messages to such control messages, and sends the control messages to the second computing device. The second computing device acts on the control messages to send the resource messages to the designated resource. The second computing device can therefore communicate with the designated resource without having a resource driver for the designated resource installed on the second computing device.

In the following description, numerous details are set forth to provide a more thorough explanation of the embodiments of the present invention. It will be apparent, however, to one skilled in the art, that the present invention may be practiced without these specific details. In some instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "generating", "hosting", "sending", "mapping" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

FIG. 1 is a block diagram of a network architecture 100, in which embodiments of the present invention may operate. The network architecture 100 includes, but is not limited to, one or more client computing devices (clients) 102 communicatively connected with a printer 130 and/or additional resources (not shown) via a client-side network 115. The network architecture 100 further includes a host server computing device (host server) 106 connected to a server-side network 118. Alternatively, or in addition, an additional computing device 150 may be connected to server-side network 118. In one embodiment, the client-side network 115 and the server-side network 118 are distinct networks. In another embodiment, the client-side network 115 and server-side network 118 are different subnetworks of a single network (e.g., subnetworks of a wide area network (WAN)). The client-side network 115 and server-side network 118 may be connected directly or via another network, such as the Internet. Each of the networks 115, 118 may be behind different firewalls, and addresses of resources and devices on each network 115, 118 may be masked by different subnetwork masks. Therefore, client-side resources may be inaccessible to the host server 106 via standard network protocols such as transfer control protocol/internet protocol (TCP/IP).

Client 102 may be a desktop computer, laptop computer, personal digital assistant (PDA), mobile phone, or other computing device. Client 102 may be a fat client (client that performs local processing and data storage), a thin client (client that performs minimal or no local processing and minimal to no data storage), or a hybrid client (client that performs local processing but little to no data storage). In one embodiment, client 102 essentially acts as an input/output device, in which a user can view a desktop environment provided by virtual machine 110 (e.g., a running instance of an operating system including storage available to the operating system and programs installed and/or running on the operating system) on a client-side display, and interact with the desktop environment via a client-side keyboard and pointing device. Alternatively, client 102 may act as an input/output device for a remote physical machine (e.g., additional computing device 150).

Client 102 includes an operating system 120, which may be a Windows operating system, a Linux operating system, or some other operating system. Client 102 may also include a pointing device (e.g., mouse), keyboard and one or more display devices (e.g., monitors), which may be used to interface with a client desktop provided by OS 120.

OS 120 includes a remote interface application (RIA) 132 that connects client 102 with host server 106 and/or with additional computing device 150. In one embodiment, remote interface application 132 connects client 102 with a virtual machine (VM) 110 hosted by host server 106. Alternatively, RIA 132 may connect client 102 with a physical machine (e.g., with additional computing device 150). Via the remote interface application 134, OS 120 may control and/or interface with one or more applications 152, 149 and/or an OS (e.g., guest OS 116 running on VM 110 or OS 155 running on additional computing device 150).

Client 102 is networked with printer 130 and/or additional client-side network resources (not shown) via client-side network 115. Other client-side network resources may include file transfer protocol (ftp) servers (or other file servers) running on other computing devices attached to client-side network 115, network cameras, scanners, fax machines, shared folders provided by storage servers attached to client-side network 115, etc. However, in one embodiment, client 102 does not include any drivers for communicating with and/or controlling printer 130 or the additional client-side network resources. For example, OS 120 may be a Linux OS, and the printer 130 may be a graphics device interface (GDI) printer (known as a winprinter) for which there may be no Linux drivers.

Client 102 may include one or more local resources (e.g., file transfer protocol (FTP) server 132) that reside on client 102, and which may run on OS 120. Examples of local resources that reside on client include an ftp server, telnet server, shared folder, etc. Local resources (e.g., FTP server 132) may not have an IP address, but may have memory addresses, thread identifiers, or other internal addresses by which OS 120 communicates with the resources.

Host server 106 includes a bare platform hardware that may be a personal computer (PC), server computer (e.g., a rackmount server or mainframe) or other computing system. The platform hardware can include a processor, memory, input/output devices, a network interface, etc. Host server 106 may be a single machine or a cluster of multiple machines.

In one embodiment, host server 106 includes a virtual machine monitor (VMM) 114 (also known as a hypervisor). The VMM 114, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The VMM 114 presents to the higher level software (commonly referred to as "guest" software) the abstraction of one or more virtual machines (VMs) 110. The VMM 114 may provide the same or different abstractions to various guest software (e.g., guest operating system, guest applications, etc.).

In one embodiment, the VMM 114 is run directly on bare platform hardware. In another embodiment, the VMM 114 is run on top of a host OS (e.g., as a kernel module of a host OS). Alternatively, for example, the VMM 114 may be run within, or on top of, another VMM. VMMs 114 may be implemented, for example, in hardware, software, firmware or by a combination of various techniques.

Host server 106 is a host machine that may be enabled to simultaneously run multiple VMs 110, where each VM 110 may be used by a remote client 102. Host server 106 allocates a certain amount of that server's resources to each of the VMs 110. Each VM 110 is then able to use the allocated resources to execute applications, including a guest operating system 116. The VMM 114 virtualizes the underlying hardware of the host server 106 or emulates hardware devices, making the use of the VMs 110 transparent to the guest operating system 116 or the remote clients 102 that use the VMs 110.

Each VM 110 may function as a self-contained platform, running its own operating system (guest OS 116) and software applications (processes) 152. Typically, the virtual machine manager (VMM) 114 manages allocation and virtualization of computer resources and performs context switching, as may be necessary, to cycle between various virtual machines.

Virtual machines 110 can be, for example, hardware emulation, full virtualization, para-virtualization, and operating system-level virtualization virtual machines. Each virtual machine 110 includes a guest operating system (guest OS) 116 that hosts one or more applications 152 within the virtual machine. The guest OSes 116 running on the virtual machines 110 can be of the same or different types (e.g., two guest OSes may both be Windows operating systems, or one may be a Windows operating system and the other a Linux operating system). Moreover, the guest OSes 116 and the host OS may share the same operating system type, or the host OS may be a different type of OS than one or more guest OSes 116. For example, a guest OS may be a Windows operating system from Microsoft and a host OS may be a Linux operating system available from Red Hat. Additionally, guest OS 116 may be the same as, or different from, operating system 120 running on client 102. For example, OS 120 may be a Linux OS, and guest OS 116 may be a Windows OS.

Guest OS 116 includes a virtual network interface controller (NIC) driver 182 for communicating with and/or controlling virtual NIC 154 (described below). Guest OS 116 may further include a separate NIC driver (not shown) for controlling another virtual NIC (not shown) and/or hardware network interface controller (not shown) that handles standard network communication traffic. Guest OS 116 may also include additional device drivers (e.g., printer driver 180) for other real and/or virtual devices.

One or more applications 152 run on guest OS 116. These applications 152 may include, for example, a word processing program, computer aided drafting program, computer game, or any other application. Moreover, OS 116 may include access to one or more virtual resources (e.g., virtual printer 156, virtual FTP server 158, etc.), each of which represents a client-side resource. In one embodiment, access to virtual resources is added to guest OS 116 in the same manner that access to standard resources is added to a typical OS. For example, to set up access to a virtual printer 156, a user may specify an address of the virtual printer (using a virtual network address) or a unique name of the virtual printer (e.g., when a dynamic name system server is used), and specify a driver (e.g., printer driver 180) to be used for the virtual printer. This may include installing the printer driver 180 (or other driver for other resources) if an appropriate driver has not previously been installed on guest OS 116.

Virtual machine 110 includes multiple virtual devices, which may include but are not limited to, a virtual network interface controller 154, a virtual pointing device (not shown), a virtual keyboard (not shown), a virtual display (not shown) etc., each of which may fully or partially emulate a real device. Virtual network interface controller (NIC) 154 emulates a real network interface controller, and is dedicated for communication with client-side resources of client-side network 115. In one embodiment, the virtual network interface controller 154 has a unique virtual subnetwork (e.g., a subnetwork that is different from a subnetwork of client-side network 115 and a subnetwork of server-side network 118).

In one embodiment, the host server 106 includes a remote interface system (RIS) 142 for VM 110. Host server 106 may include a single remote interface system 142, or a separate remote interface system 142 for each VM. The remote interface system 142 may be part of the VMM 114 (as illustrated), part of a hardware emulation layer, or run on top of the VMM 114.

In one embodiment, RIS 142 includes one or more virtual resources, each of which represents a real client-side resource (dedicated resource). For example, RIS 142 includes a virtual FTP server 158 that represents FTP server 132 and a virtual printer 156 that represents printer 130. All virtual resources included in the RIS 142 have virtual IP addresses that are within the virtual subnetwork of the virtual NIC 154 (under the subnet mask of the virtual NIC 154). For example, if the virtual subnetwork is 11.0.3.1-255, the virtual resources may have virtual network addresses ranging from 11.0.3.1.1 to 11.0.3.255. Thus, all the network messages that are sent from the guest to the virtual address pass through NIC 154. All the packets that are sent via NIC 154 may then be passed to RIS 142.

In one embodiment, the RIS 142 generates virtual network addresses for virtual resources by generating a hash of one or more identifiers associated with a client-side resource. In one embodiment, a hash is generated using a combination of a unique identifier of the client-side resource (e.g., the device name and/or the client-side network address) and a unique identifier of the client-side network 115, such as a domain name, on which the client-side resource resides. Therefore, the same virtual network address will be used for different executions of a remote interface application 134 (e.g., on different clients). This keeps virtual network addresses consistent with the resources that they represent in a specific network.

Each of the virtual resources further includes the client-side address of the client-side resource associated with the virtual resource. Virtual resources may also include a mapping of the virtual network address to the client-side address. For client-side resources that are network resources (e.g., a networked printer 130), the client-side address may be a network address (e.g., an IP address and port). For client-side resources that reside on the client (e.g., FTP server 132), the client-side address may be a memory space address, or other addressable space within client 102.

In one embodiment, the RIS 142 includes a domain name system (DNS) server (not shown). The DNS server may map names of virtual resources to virtual network addresses dynamically. Therefore, when a resource message is generated (e.g., by printer driver 180), the resource message may be directed to the virtual resource by name rather than by the virtual resource's virtual network address. When a DNS query about a virtual resource name reaches virtual NIC 154, virtual NIC 154 forwards the DNS query to RIS 142. In one embodiment, the DNS query is comprised of network packets generated by guest OS 116. RIS 142 collects and analyzes the network packets. When RIS 142 recognizes a DNS query from received network packets, and the corresponding name is a virtual resource name, RIS 142 responds to the query with a corresponding virtual IP address. A response can then be sent back to the guest OS 116 through virtual NIC 154.

The RIS 142 may generate a new virtual resource for any client-side resources for which a corresponding virtual resource does not already exist. In one embodiment, virtual resources are added to RIS 142 using configuration files that identify a client-side address for the resource. The configuration files may also include a resource type (e.g., printer, fax machine, etc.), drivers associated with the resource, and other information. In another embodiment, remote interface system 142 receives a notice or notices of available client-side resources, which may include addresses of the client-side resources, type and model information for those resources, and/or other information. These notices may be used to add virtual resources to RIS 142.

Remote interface application 134 may negotiate with remote interface system 142 to establish one or multiple connections (channels) between VM 110 and remote interface application 134 over networks 115, 118. Established connections provide bidirectional communication between the VM 110 and client 102. Such communication may include graphics messages, print messages, etc. sent to client 102, as well as cursor messages, keyboard messages, etc. sent to VM 110. In one embodiment, the RIS 142 and remote interface application 134 use a shared connection for the communication of graphics messages, cursor messages, keyboard messages and messages originated from or directed to client-side resources. Alternatively, separate connections for different types of data (e.g., a first connection for graphics messages and another connection for printer messages) may be used. In one embodiment, the remote interface application 134 communicates with host server 106 using a remote access protocol (e.g., Remote Desktop Protocol (RDP), Simple Protocol for Independent Computing Environments (SPICE™) provided by Red Hat, Inc., etc.) that allows for one or multiple dedicated connections (channels) between VM 110 and client 102. In some embodiments, the RIS 142 and/or remote interface application 134 perform additional processing (e.g., compression, encryption, streaming, etc.) on communications.

In one embodiment, after a connection is established between the remote interface system 142 and the remote interface application 134, the remote interface application 134 identifies available client side resources to remote interface system 142. This may be in response to the RIS 142 querying the remote interface application 134 (e.g., using a command message) for available client-side resources.

When guest OS 116 and/or an application 152 use or otherwise communicate with a client-side resource, appropriate resource messages (e.g., printer messages formatted in postscript for a print command to printer 130) are generated on guest OS 116. These resource messages are addressed to an associated virtual resource 156, 158. Each resource message that is directed to a virtual resource is sent to the virtual NIC 154. The virtual NIC 154 sends the resource message to the addressed virtual resource 156, 158 in the RIS 142. In one embodiment, the virtual NIC 154 arranges the resource message into network packets, and sends the network packets to RIS 142.

Resource messages may be received as a collection of network packets. These network packets may be generated by guest OS 116 (or a driver or application running on guest OS 116), sent to virtual NIC 154, and forwarded by virtual NIC 154 to RIS 142. RIS 142 performs a network stack analysis of received network packets that comprise a resource message to determine if the resource message is directed to a virtual resource. The analysis of the network packets may include identifying formatting and protocols of the packet contents, identifying a destination of the packet contents, sending back messages from the RIS 142 to the guest OS 116 through the NIC 154 (e.g., TCP/IP synchronize (SYN) and acknowledgment (ACK) messages), etc. In one embodiment, network packets that are directed to a virtual resource are translated by the RIS 142 into an appropriate format for transmittal to client 102.

After receiving the resource message, which may be in the form of network packets, RIS 142 may generate one or more control messages, each of which causes remote interface application 134 to perform an action associated with a client-side resource. Each control message identifies a client-side resource in a manner that enables RIA 134 to perform the action. In one embodiment, RIS 142 uses the mapping between the virtual network address and the client-side address to identify the client-side address of the client-side resource in the control message. Alternatively, RIS 142 may identify the virtual network address of the virtual resource in the control message, in which case the RIA 134 identifies the client side address from the virtual network address. In one embodiment, RIA 134 includes a copy of the mappings of the virtual network addresses to the client-side addresses for each virtual resource for making such an identification.

Examples of control messages include an "open connection" control message, "send to resource" control message, "close connection" control message, "disable sending" control message, "disable receiving" control message, and so on. Each message may identify the virtual address, the client-side address, or both. In one embodiment, control messages include instructions that can be executed to perform the associated action. Alternatively, the RIA 134 may already include the instructions necessary for performing each action. Therefore, each control message may simply include 1) a control identifier that indicates which control action to perform, and 2) an indication of an address with which to perform the action. For example, an "open connection" control action may be associated with command ID 1, while a "send to resource" control action may be associated with command ID 2. When the RIA 134 receives a control message that identifies printer 130 and command ID 1, it performs the "open connection" control action with regards to the printer 130. Each control message may be composed of multiple network packets.

In one embodiment, the remote interface system 142 generates a "send to resource" control message after receiving a resource message designated to the resource, from virtual NIC 154, and attaches the corresponding resource message to the "send to resource" control message. When the remote interface application 134 receives the "send to resource" control message, it executes instructions included in and/or associated with the control message. This causes the RIA 134 to send the attached resource message to the resource using the client side address. If the client-side address was not identified in the "send to resource" control message, the RIA 134 also translates the virtual network address to the client-side address using an appropriate mapping. Since the remote interface application 134 is merely opening connections to the resource, and sending already formatted messages to the resource, the OS 120 does not need to be able to interpret messages received from the resource, or generate messages that the resource can interpret. Accordingly, the OS 120 does not need any specific drivers for controlling or communicating with the resource. This enables server 106 to communicate with client-side resources via client 102 even when client 102 does not include drivers for performing such communication.

For illustration, consider the example of a user of client 102 requesting that an application 152 print a file to printer 132. The printer driver 180 receives a print command along with data to render to a printer format. The printer driver 180 renders the data into the printer format (e.g., pdf, postscript, etc.), and sends the data to the virtual network address of the virtual printer 156 in the form of a resource message (which may be sent as multiple network packets). This causes the rendered data (resource message) to be sent to the virtual NIC 154. The virtual NIC 154 communicates the rendered data to the virtual printer 156 in remote interface system 142. The remote interface system 142 generates a "send to printer" control message (which may include translating the virtual network address to a client-side network address using the mapping), attaches the rendered data to the control message, and sends the control message to remote interface application 134. The remote interface application then removes the rendered data from the "send to printer" control message, and sends the rendered data on to the printer 130. This example assumes that a connection has already been opened to the printer 130.

When the RIS 142 receives a resource message, it may check to verify whether the client 102 has an open connection to a client-side resource. In one embodiment, the RIS 142 maintains a list of open connections to client-side resources. Therefore, the check may simply involve determining whether the addressed client-side resource is on the list of open connections. If there is no open connection to the client-side resource, the RIS 142 generates an "open connection" control message, and sends it to RIA 134. When the remote interface application 134 receives the "open connection" control message, it opens a connection with the appropriate resource using the client-side address. If the client-side resource is a network resource, the client opens a socket to the client-side resource using a network address of the resource. If the client-side resource is located on the client 102, the client does not need to open a socket to the resource.

In one embodiment, before receiving a resource message (e.g., packets that contain data for a resource message), the RIS 142 receives one or more messages for establishing a connection (e.g., SYN packets, ACK packets, etc.) that cause the RIS 142 to open a connection to a client-side resource. The messages may be received from the virtual NIC 154. For example, in the TCP/IP protocol, the protocol handles the opening of reliable connections. This may include virtual NIC 154 sending a SYN packet to RIS 142, RIS 142 sending a SYN-ACK packet back to virtual NIC 154, and finally the virtual NIC 154 sending an ACK packet back to RIS 142. Therefore, if TCP/IP is used between the virtual NIC 154 and the RIS 142, when the RIS 142 receives a message or messages for opening a connection (e.g., SYN packets, etc.) from the NIC 154, the RIS 142 generates an "open connection" control message, and sends the "open connection" control message to the client.

An open connection may be used for bidirectional communication between the client-side resource and the remote interface application 134. Since the remote interface application further has a bidirectional communication with the VM 110, bidirectional communication between the VM 110 and the client-side resource is established. Therefore, messages may be sent from the host server 106 to the client-side resource, as well as from the client-side resource to the host server 106. Messages sent from the client-side resource may include status updates, connection termination messages, etc.

In one embodiment, RIA 134 forwards messages received from a client-side resource via an open connection to RIS 142. RIS 142 translates the received message to network packets that appear to have originated from the virtual network address of the virtual resource associated with the client-side resource. The network packets are sent to virtual NIC 154, which sends them on to guest OS 116.

The virtual network interface controller 154 (or NIC 160), RIS 142 and RIA 134 act together to enable the client-side resources to be utilized by guest OS 116 without having any special dedicated application installed on the guest OS 116 or on the client 102. Moreover, these components enable the guest OS 116 to utilize the client-side resources without the client having drivers for interfacing with and/or controlling the client-side resources.

In one embodiment, the RIS 142 includes a resource filter that can prevent access to one or more client-side resources. In one embodiment, the resource filter limits the type of resources that can be accessed through the virtual NIC 154. For example, the resource filter may only allow tunneling of resource messages to printers. In one embodiment, the resource filter analyzes resource messages for suspicious content. One example of suspicious content is when the content does not match a format of a network protocol that is expected (e.g., line printer requester/line printer daemon (LPR/LPD), hypertext markup language (HTML), etc.). If the content of a resource message is determined to be suspicious, the resource message may be blocked from transmittal to the client 102.

Additional computing device 150 may be a personal computer, server computer, or other computing device. Additional computing device 150 includes an operating system 155, which may be the same as, or different from, OS 120 of client 102. In one embodiment, additional computing device 150 includes a virtual NIC driver 138, a virtual NIC 167, a printer driver 145, one or more applications 149, and a remote interface system 196 (which includes a virtual printer 163 and a virtual FTP server 165). In one embodiment, the virtual NIC driver 138, virtual NIC 167, printer driver 145, one or more applications 149 and remote interface system 196 function as described above for virtual NIC driver 182, virtual NIC 154, printer driver 180, one or more applications 152 and remote interface system 142, respectively. Thus, these components, in conjunction with RIA 134, enable client 102 to control and/or interact with additional computing device 150. However, additional computing device 150 does not include a VMM or any VMs. Thus, the RIS 196 and virtual NIC 167 run on the OS 155 rather than on a virtual machine or a virtual machine monitor.

Figure 2:
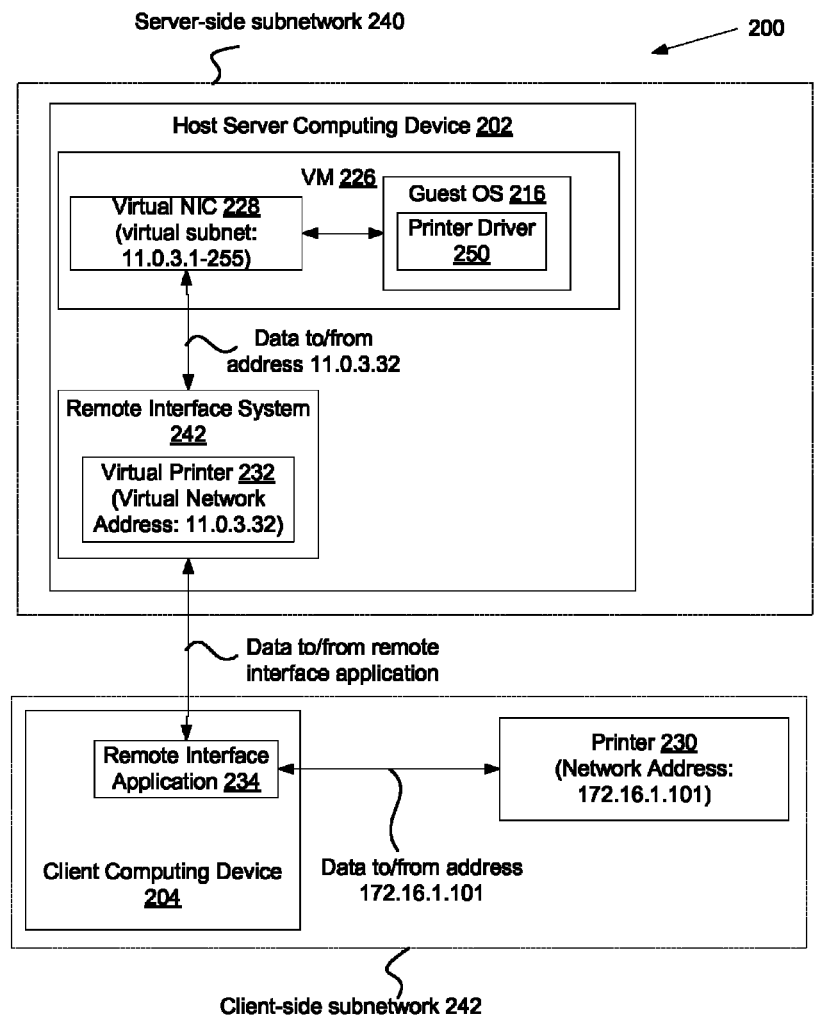
FIG. 2 is a block diagram of a virtualization system, showing communication channels between components, in accordance with one embodiment of the present invention.

FIG. 2 illustrates messages being communicated between various components of a virtualization system 200, in accordance with one embodiment of the present invention. Virtualization system 200 includes a client computing device (client) 204 connected to a printer 230 and a host server computing device (host server) 202. Host server 202 may correspond to host server 106 of FIG. 1, and client 204 may correspond to client 102 of FIG. 1. Host server 202, client 204 and printer 230 are all part of a network, which may be a wide area network (WAN), local area network (LAN), etc. The network is divided into a server-side subnetwork 240, on which the host server 202 resides, and a client-side subnetwork 242, on which the client 204 and printer 230 reside. Therefore, the host server 202 may not be able to access printer 230 using standard network protocols, such as TCP/IP.

Host server 202 includes a remote interface system 242 and a virtual machine 226, which includes a virtual network interface controller 228 and a guest OS 216. Client 204 includes a remote interface application 234. The virtual NIC 228, remote interface system 242 and remote interface application 234 act together to enable the guest OS 216 to access printer 230. When guest OS 216 (or some other application) is to access printer 230, a printer driver 250 included in guest OS 216 generates a print message that is formatted in a format readable by the printer. The resource message is directed to a virtual network address of a virtual printer 232 included in the remote interface system 242 rather than to the actual printer 230. The virtual network address of the virtual printer 232

(shown as IP address 11.0.3.32) is in a virtual subnetwork (11.0.3.1-255) of the virtual NIC 228.

The guest OS 216 sends the formatted resource message to the virtual NIC 228, which sends it on to remote interface system 242 using the virtual network address. The remote interface system 242 generates an open connection message that identifies the printer 230. The open connection message may identify the printer using a real network address of the printer (shown as IP address 172.16.1.101) or the virtual network address (11.0.3.32) of the virtual printer.

In one embodiment, the resource message is composed of a collection of network packets (e.g., TCP/IP packets). The RIS 242 receives all network packets (including those that make up a print message that is directed to the virtual printer 232). In one embodiment, the RIS 242 analyzes a network stack that includes the network packets that make up the print message. The RIS 242 determines from the network packets whether the RIS 242 should generate an "open connection," "close connection," "data transfer," or other control message. For example, if a TCP/IP (or user datagram protocol (UDP)) connection initiation is detected in the network packets, RIS 142 generates an open connection message and sends it to the client 102. The open connection message causes the client to establish a connection with the designated resource.

The RIS 242 sends the open connection message to remote interface application 234. The open connection message is sent using a connection that has been established between the RIS 242 and RIA 234 using a protocol such as RDP or SPICE. The remote interface application 234 acts on the open connection message, and opens a bidirectional connection with printer 230 using the actual network address (shown as IP address 172.16.1.101) of the printer 230. This may include opening a socket to printer 230 and/or mapping the virtual network address of the virtual printer 232 to the real network address of the printer 230. If the printer 230 is identified by the virtual network address, then RIA 234 includes a mapping of the virtual network address to the real network address, which the RIA 234 uses to determine the network address with which to open the connection. RIA 234 may notify RIS 242 when an open connection has been established. RIS 242 may report the open connection back to the guest OS. In one embodiment, the RIS 242 generates network packets that include the information to report, and sends the network packets to virtual NIC 228.

RIS 242 also generates a "send to printer" control message that identifies the printer 230 (e.g., in the same manner that the open connection message identified the printer), and attaches the resource message to the "send to printer" control message. RIS 242 sends the "send to printer" control message to RIA 234. In one embodiment, the "send to printer" control message is sent to RIA after an open connection confirmation is received from RIA 234. Alternatively, RIS 242 may send the "send to printer" control message to RIA 234 before receiving such a confirmation.

Upon receiving the "send to printer" control message, RIA 234 sends the resource message to the printer 230 using the open connection. In one embodiment, the RIA 234 removes the resource message from the "send to printer" control message before sending it on to printer 230.

Once an open connection has been established between printer 230 and client 204, guest OS 216 may send numerous print messages to printer 230 until the connection is closed. Moreover, printer 230 can send messages back to guest OS 216, such as status messages, alerts (e.g., paper jam, low ink, low paper), etc. Printer 230 sends messages to client 204 using the open connection. RIA 234 receives the messages, and sends them on to RIS 242. RIS may translate the messages (e.g., into TCP/IP packets) so that it appears that they have originated from the virtual printer 232. Alternatively, RIA 134 may perform such translation before sending the message on to RIS 242. RIS 242 sends the message to virtual NIC 228, which forwards the message on to guest OS 216.

Figure 3:
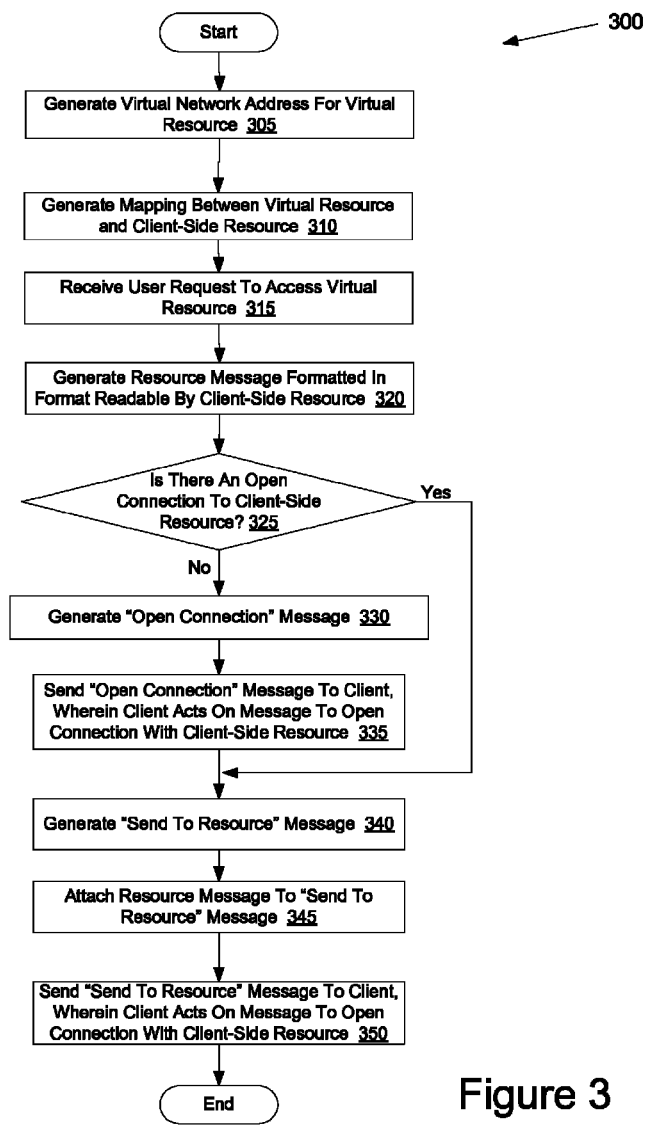
FIG. 3 is a flow diagram illustrating a method for accessing remote resources, in accordance with one embodiment of the invention.

FIG. 3 is a flow diagram illustrating a method 300 for accessing remote resources, in accordance with one embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by an RIS running on server computing device 106 of FIG. 1. In another embodiment, method 300 is performed by an RIS running on additional computing device 150 of FIG. 1.

Referring to FIG. 3, at block 305, an RIS generates a virtual network address for a virtual resource that represents a designated real client-side resource. The virtual network address may be generated using a hash function that hashes the client-side address and a unique identifier of a client-side network on which the client resides. At block 310, the RIS generates a mapping between the virtual network address of the virtual resource and the client-side address of the real client-side resource that the virtual resource represents. In one embodiment, generating the virtual network address and mapping the virtual network address to the real network address are performed in a single operation.

At its simplest, the virtual resource may include only the virtual network address that is used for communication with a virtual network interface controller, the client-side address that is used for communication with the real resource on a client-side network, and the mapping between the two. Alternatively, the virtual resource may include additional components and/or information, such as a resource type, driver associated with the resource, etc. The mapping may be generated when the virtual resource is generated, or may be determined when the RIS connects with the client.

At block 315, the RIS receives a user request to access the virtual resource. At block 320, the RIS generates a resource message formatted in a format readable by the client-side resource. In one embodiment, the resource message is generated by a device driver for the client-side resource that is installed on the guest OS. The resource message may be sent to the virtual network interface controller, which may forward the resource message to the remote interface system. In one embodiment, the resource message is comprised of a collection of data packets (e.g., TCP/IP packets). The RIS may analyze a network stack to identify the contents of the data packets. The RIS may perform network stack handling, such as rearranging the packets, identifying message protocols, generating acknowledgment messages or control messages, etc. By analyzing the stack, the RIS determines what actions to perform to connect to and send data to a designated resource.

At block 325, the RIS determines whether there is an open connection between the client and the client-side resource (e.g., by checking a list of open connections that may be maintained by the remote interface system). If there is an open connection, the method proceeds to block 340. If no open connection between the client and client-side resource exists, the method continues to block 330.

At block 330, the RIS generates an "open connection" control message that identifies the client-side resource (e.g., via the client-side address or the virtual network address). At block 335, the RIS sends the "open connection" control message to the client. In one embodiment, the "open connection" control message is sent from the remote interface system to a remote interface application running on the client. The client (e.g., the remote interface application) acts on the "open connection" control message by opening a connection to the client-side resource using the client-side network address (e.g., an IP address that is under the same subnet mask as the client).

At block 340, the RIS generates a "send to resource" control message that identifies the client-side resource (e.g., via the client-side address or the virtual network address). At block 345, the RIS attaches the resource message to the "send to resource" control message. The RIS may also perform application level processing on the resource message. In one embodiment, the RIS changes data in the resource message to replace references to the virtual network address with references to the client-side address. For example, if the resource message has been formatted according to the Internet Printing Protocol, the RIS may change a header of the resource message to replace the virtual network address with the client-side network address.

At block 350, the RIS then sends the "send to resource" control message to the client. The "send to resource" control message, when acted on by the client, causes the client to transmit the resource message to the client-side resource via the open connection. The method then ends.

Figure 4:
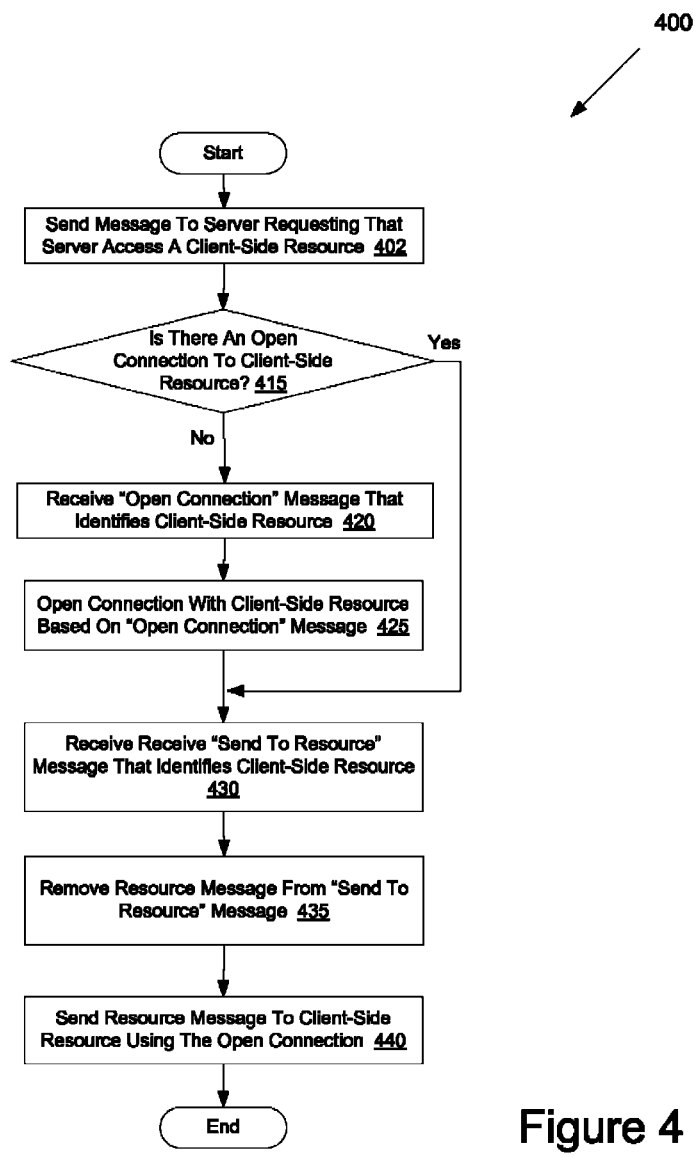
FIG. 4 is a flow diagram illustrating a method for enabling a remote computing device to access client-side resources, in accordance with one embodiment of the invention.

FIG. 4 is a flow diagram illustrating a method 400 for enabling a remote server to access client-side resources, in accordance with one embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by client computing device 102 of FIG. 1.

Referring to FIG. 4, at block 402 a client attempts to perform an operation on a guest OS running on a host server (or on an OS running on a remote physical computing device). For example, the guest OS may be part of a VM running on a host server. The client may request that an application running on the guest OS print a document or file to a printer that is networked with the client. This request may trigger the use of a client side resource (e.g., a client-side printer).

At block 415, if there is an open connection between the client-side resource and the client (e.g., if the client had previously received an open connection message), the method proceeds to block 430. If there is no open connection between the client-side resource and the client, the method continues to block 420.

At block 420, the client receives an "open connection" control message that identifies the client-side resource. In one embodiment, the remote interface application receives the "open connection" control message from the remote interface server. The "open connection" control message may identify the client-side resource using a client-side address (e.g., a network address that is masked by a subnet mask of a sub-network on which the client resides) or a virtual network address (a unique network address that is masked by a subnet mask of a virtual network). If the message identifies the client-side resource by the virtual network address, the client may use a mapping between the virtual network address and the client-side network address to determine the client-side network address. In one embodiment, this mapping is communicated to the client by the server. At block 425, the client opens the connection with the client-side resource in response to the "open connection" control message.

At block 430, the client receives a "send to resource" control message that identifies the client-side resource from the server. In one embodiment, the remote interface application receives the "send to resource" control message from the remote interface system. At block 435, the client removes a resource message from the "send to resource" control message. The removed resource message includes instructions that have been formatted into a format that is readable by the client-side resource. At block 440, the client sends the resource message to the client-side resource using the open connection. The client-side resource may then execute the instructions (or otherwise act on the instructions) to perform a requested operation. For example, a printer may print a file upon receiving the resource message. The method then ends.

Figure 5:
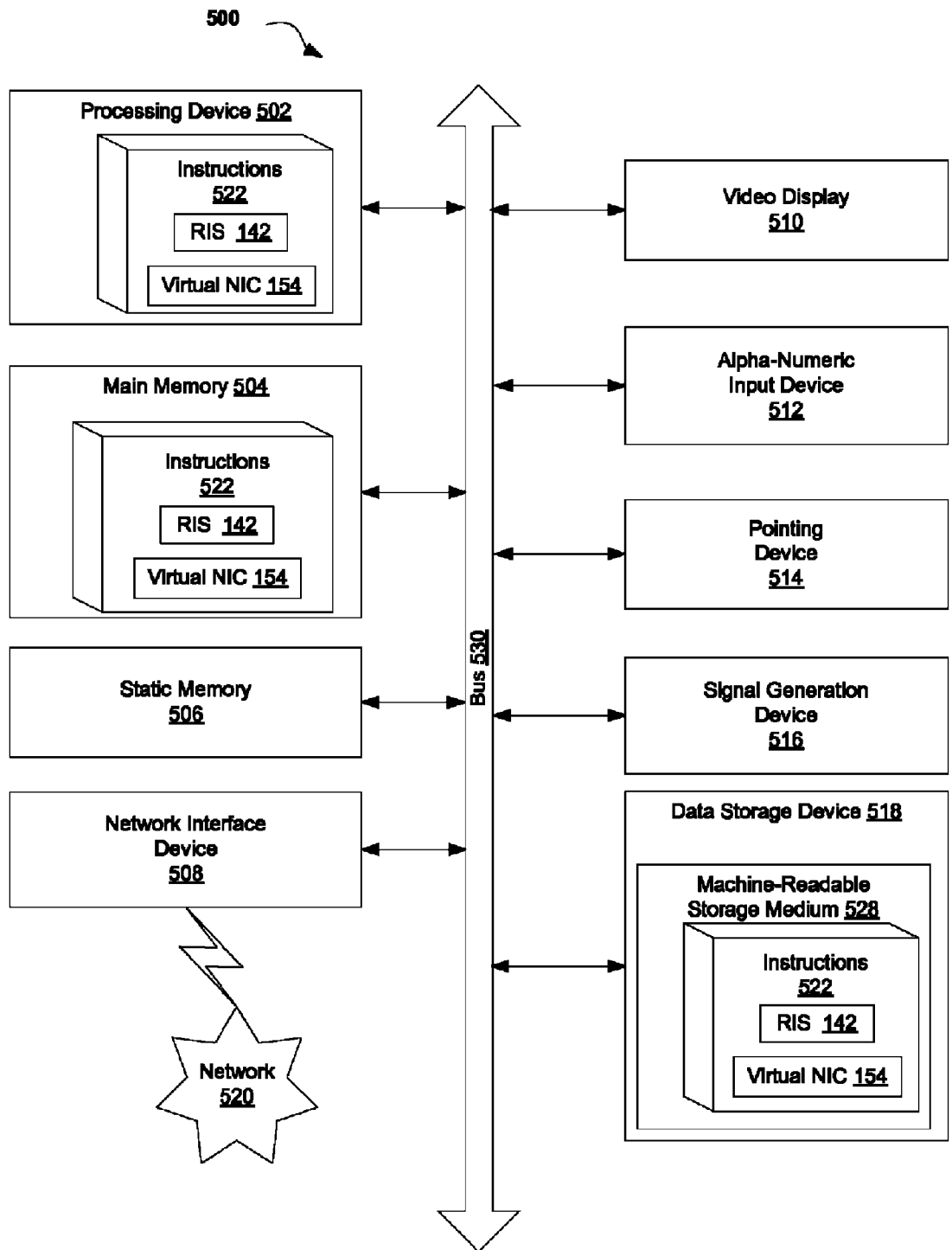
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., instructions 522) for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a pointing device 514 (e.g., a mouse), and a signal generation device 516 (e.g., a speaker).

The data storage device 518 may include a machine-readable storage medium 528 on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-readable storage media.

The machine-readable storage medium 528 may also be used to store instructions for a remote interface system (RIS) 142 and a virtual network interface controller (NIC) 154 of FIG. 1, and/or a software library containing methods that call the RIS 142 and virtual NIC 154. Alternatively, the machine-readable storage medium 528 may be used to store instructions for a remote interface application 234 and/or a software library containing methods that call the remote interface application 234. While the machine-readable storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims.

What is claimed is:

1. A method comprising:
mapping, by a first computing device, a virtual network address for a virtual resource that is accessible to the first computing device to an address of a designated resource that is inaccessible to the first computing device but accessible to a remote second computing device;
generating a resource message for the virtual resource using a resource driver for the designated resource, wherein the resource message is formatted in a format readable by the designated resource;
attaching the resource message to a control message, wherein the control message, when acted upon by the second computing device, causes the second computing device to transmit the resource message to the designated resource;
sending the control message from the first computing device that comprises the resource driver for the designated resource to the second computing device that lacks the resource driver for the designated resource, wherein the control message causes the second computing device to send the resource message to the designated resource without having the resource driver for the designated resource; and
translating the resource message from the virtual network address of the virtual resource to the address of the designated resource using the mapping when the control message lacks an address of the designated resource.

2. The method of claim 1, further comprising:
generating the resource message in response to receiving a request to access the virtual resource.

3. The method of claim 1, further comprising:
generating an open connection message that, when acted upon by the second computing device, causes the second computing device to open a connection to the designated resource; and
sending the open connection message to the second computing device, wherein the open connection message causes the second computing device to establish a bidirectional connection with the designated resource.

4. The method of claim 1, wherein the designated resource is a printer device that is networked with the second computing device on a local area network, and wherein the virtual resource is a virtual printer that is a virtual representation of the printer device.

5. The method of claim 1, wherein the first computing device resides at a first network and the second computing device resides at a second network, and wherein the first computing device comprises a virtual network interface controller that is dedicated for communication with the second network, the virtual network interface controller to receive the resource message and forward the resource message to a remote interface system hosted by the first computing device.

6. The method of claim 5, wherein the resource message is received as a plurality of packets, the method further comprising:
performing a network stack analysis of the plurality of packets by the remote interface system to determine whether the resource message is directed to the virtual resource; and
upon determining that the resource message is directed to the virtual resource, generating the control message, attaching the resource message to the control message and sending the control message to the second computing device by the remote interface system.

7. The method of claim 1, further comprising:
generating the virtual network address by creating a hash of the virtual network address and a unique identifier of a network on which the second computing device resides.

8. A non-transitory computer readable storage medium comprising instructions that, when executed by a first computing device, cause the first computing device to perform operations comprising:
mapping, by the first computing device, a virtual network address for a virtual resource that is accessible to the first computing device to an address of a designated resource that is inaccessible to the first computing device but accessible to a remote second computing device;
generating a resource message for the virtual resource using a resource driver for the designated resource, wherein the resource message is formatted in a format readable by the designated resource;
attaching the resource message to a control message, wherein the control message, when acted upon by the second computing device, causes the second computing device to transmit the resource message to the designated resource;
sending the control message from the first computing device that comprises the resource driver for the designated resource to the second computing device that lacks the resource driver for the designated resource, wherein the control message causes the second computing device to send the resource message to the designated resource without having the resource driver for the designated resource; and
translating the resource message from the virtual network address of the virtual resource to the address of the designated resource using the mapping when the control message lacks an address of the designated resource.

9. The non-transitory computer readable storage medium of claim 8, the operations further comprising:
generating the resource message in response to receiving a request to access the virtual resource.

10. The non-transitory computer readable storage medium of claim 8, the operations further comprising:
- generating an open connection message that, when acted upon by the second computing device, causes the second computing device to open a connection to the designated resource; and
- sending the open connection message to the second computing device, wherein the open connection message causes the second computing device to establish a bidirectional connection with the designated resource.

11. The non-transitory computer readable storage medium of claim 8, wherein the designated resource is a printer device that is networked with the second computing device on a local area network, and wherein the virtual resource is a virtual printer that is a virtual representation of the printer device.

12. The non-transitory computer readable storage medium of claim 8 wherein the first computing device resides at a first network and the second computing device resides at a second network, and wherein the first computing device comprises a virtual network interface controller that is dedicated for communication with the second network, the virtual network interface controller to receive the resource message and forward the resource message to a remote interface system hosted by the first computing device.

13. The non-transitory computer readable storage medium of claim 12, wherein the resource message is received as a plurality of packets, the operations further comprising:
- performing a network stack analysis of the plurality of packets by the remote interface system to determine whether the resource message is directed to the virtual resource; and
- upon determining that the resource message is directed to the virtual resource, generating the control message, attaching the resource message to the control message and sending the control message to the second computing device by the remote interface system.

14. The non-transitory computer readable storage medium of claim 8, the operations further comprising:
- generating the virtual network address by creating a hash of the virtual network address and a unique identifier of a network on which the second computing device resides.

15. A computing device comprising:
- a memory to store instructions for a remote interface system; and
- a processing device, to execute the instructions, wherein the instructions cause the processing device to:
- map a virtual network address for a virtual resource that is accessible to the computing device to an address of a designated resource that is inaccessible to the computing device but accessible to a remote additional computing device;
- generate a resource message for the virtual resource using a resource driver for the designated resource, wherein the resource message is formatted in a format readable by the designated resource;
- attach the resource message to a control message, wherein the control message, when acted upon by the additional computing device, causes the additional computing device to transmit the resource message to the designated resource;
- send the control message from the computing device that comprises the resource driver for the designated resource to the additional computing device that lacks the resource driver for the designated resource, wherein the control message causes the additional computing device to send the resource message to the designated resource without having the resource driver for the designated resource; and
- translate the resource message from the virtual network address of the virtual resource to the address of the designated resource using the mapping when the control message lacks an address of the designated resource.

16. The computing device of claim 15, further comprising the instructions to cause the processing device to:
- generate an open connection message that, when acted upon by the additional computing device, causes the additional computing device to open a connection to the designated resource; and
- send the open connection message to the additional computing device, wherein the open connection message causes the additional computing device to establish a bidirectional connection with the designated resource.

17. The computing device of claim 15, wherein the designated resource is a printer device that is networked with the additional computing device on a local area network, and wherein the virtual resource is a virtual printer that is a virtual representation of the printer device.

18. The computing device of claim 15, wherein the computing device resides at a first network and the additional computing device resides at a second network.

19. The computing device of claim 15, wherein the resource message is received as a plurality of packets, the instructions further to cause the processing device to:
- perform a network stack analysis of the plurality of packets to determine whether the resource message is directed to the virtual resource, and
- upon determining that the resource message is directed to the virtual resource, generate the control message, attach the resource message to the control message and send the control message to the additional computing device.

* * * * *